United States Patent
Cordatos (10) Patent No.: US 9,926,854 B2
(45) Date of Patent: Mar. 27, 2018

(54) LIGHTWEIGHT MIST ELIMINATOR FOR AIRCRAFT FUEL TANK INERTING SYSTEMS

(71) Applicant: Hamilton Sundstrand Corporation, Windsor Locks, CT (US)

(72) Inventor: Haralambos Cordatos, Colchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 271 days.

(21) Appl. No.: 14/635,320

(22) Filed: Mar. 2, 2015

(65) Prior Publication Data

US 2016/0258362 A1    Sep. 8, 2016

(51) Int. Cl.
*F02C 9/18* (2006.01)
*B01D 45/16* (2006.01)
*B01D 39/16* (2006.01)

(52) U.S. Cl.
CPC ............... *F02C 9/18* (2013.01); *B01D 39/16* (2013.01); *B01D 45/16* (2013.01); *B01D 2239/065* (2013.01); *B01D 2239/0695* (2013.01); *B01D 2275/105* (2013.01)

(58) Field of Classification Search
None
See application file for complete search history.

(56) References Cited

U.S. PATENT DOCUMENTS

| | | | | |
|---|---|---|---|---|
| 4,299,702 A * | 11/1981 | Bairinji | ................. | B01D 63/10 210/321.83 |
| 4,302,356 A * | 11/1981 | Smith, Jr. | .............. | B01D 3/009 203/DIG. 6 |
| 4,471,014 A * | 9/1984 | den Hartog | ............ | B01D 59/32 261/DIG. 72 |
| 4,818,257 A | 4/1989 | Kennedy et al. | | |

(Continued)

FOREIGN PATENT DOCUMENTS

| EP | 2510997 A1 | 10/2012 |
|---|---|---|
| WO | 2015143155 A1 | 9/2015 |

OTHER PUBLICATIONS

Extended European Search Report, for European Patent Application No. 16158196.2, dated Jul. 26, 2016, 6 pages.

(Continued)

*Primary Examiner* — Amber R Orlando
*Assistant Examiner* — Britanny Precht
(74) *Attorney, Agent, or Firm* — Kinney & Lange, P.A.

(57) ABSTRACT

A spiral mist elimination system includes a container with an inlet and a layered assembly in fluid communication with the inlet. The layered assembly contains a spiral shape and is concentric with a central axis of the container. The layered assembly imparts centrifugal motion in the engine bleed air as the engine bleed air travels spirally inward. The first portion of the layered assembly receives the first set of droplets. The layered assembly also includes a mesh matrix that collects a second set of droplets. The second set of droplets impacts the mesh matrix and coalesces to form a (Continued)

third set of droplets. A perforated tube is disposed along the central axis of the container. The perforated tube collects the engine bleed air from the layered assembly. Gravity draws the first and third sets of droplets into a reservoir.

18 Claims, 5 Drawing Sheets

(56) References Cited

U.S. PATENT DOCUMENTS

| | | | | |
|---|---|---|---|---|
| 4,842,736 A * | 6/1989 | Bray | ............... | B01D 63/10 210/321.61 |
| 5,096,584 A * | 3/1992 | Reddy | ............... | B01D 53/22 210/321.74 |
| 5,114,582 A * | 5/1992 | Sandstrom | ............... | B01D 65/003 210/321.74 |
| 5,120,331 A * | 6/1992 | Landy | ............... | B01D 46/2411 55/471 |
| 5,147,541 A * | 9/1992 | McDermott, Jr. | ............... | B01D 63/10 156/290 |
| 5,151,198 A | 9/1992 | McCullough, Jr. et al. | | |
| 5,178,753 A * | 1/1993 | Trabold | ............... | B01D 29/072 210/130 |
| 5,538,642 A * | 7/1996 | Solie | ............... | B01D 53/22 210/321.83 |
| 5,933,702 A * | 8/1999 | Goswami | ............... | A61L 9/205 422/186.3 |
| 6,224,767 B1 * | 5/2001 | Fujiwara | ............... | B01D 53/22 210/232 |
| 6,398,833 B1 | 6/2002 | Santerre et al. | | |
| 6,957,569 B1 | 10/2005 | Napier et al. | | |
| 7,753,172 B2 | 7/2010 | Munson | | |
| 7,857,882 B1 | 12/2010 | Johnson | | |
| 8,500,869 B1 | 8/2013 | Johnson et al. | | |
| 8,601,826 B2 | 12/2013 | Army et al. | | |
| 8,661,648 B2 * | 3/2014 | Jons | ............... | B01D 63/10 210/321.72 |
| 2003/0072675 A1 * | 4/2003 | Takeda | ............... | A61L 9/22 422/22 |
| 2003/0205520 A1 * | 11/2003 | Johnson | ............... | B01D 63/10 210/321.85 |
| 2004/0007000 A1 * | 1/2004 | Takeda | ............... | A61L 9/22 62/78 |
| 2004/0255515 A1 * | 12/2004 | Fenton | ............... | C10L 1/10 48/189.3 |
| 2005/0191223 A1 * | 9/2005 | Collins | ............... | B01D 53/8675 423/210 |
| 2007/0251883 A1 * | 11/2007 | Niu | ............... | B01D 61/025 210/653 |
| 2010/0224161 A1 * | 9/2010 | Kolczyk | ............... | B01D 35/147 123/196 A |

OTHER PUBLICATIONS

Series CLC Coalescers/Separatos, Centrifugal In-Line Gas Liquid Separators Flanged Connections, Two-Stage Design for Maximum Efficiency, p. 14-p. 15, 2006, Eaton Filtration Gas/Liquid Separators.

Industrial Solutions, Ingersoll-Rand Water Separators, Industrial Solutions, 2004 Ingersoll-Rand Company, Form CCN: 38432605.

* cited by examiner

LIGHTWEIGHT MIST ELIMINATOR FOR AIRCRAFT FUEL TANK INERTING SYSTEMS

BACKGROUND

The present invention relates to membrane-based separation systems, and in particular, to a light-weight mist eliminator for a membrane-based separation system.

Certain mist eliminator systems function in a way to remove low pressure vapor fluids from inlet air. In particular, the presence of low vapor pressure fluids such as compressor oils and hydraulic fluids, typically in the form of fine aerosols (mist), can result in premature deactivation of membranes fairly rapidly as they permanently coat the membrane's selective layers.

Bleed air from aircraft turbines can contain such aerosols. The concentration of these aerosols in bleed air can reach more than an order of magnitude larger than a maximum recommended by membrane manufacturers. Pretreatment is therefore crucial to preventing failure events such as premature membrane deactivation in aircraft nitrogen generation systems (NGS).

SUMMARY

A spiral mist elimination system includes a container with an inlet to receive engine bleed air into the container. The container includes a layered assembly in fluid communication with the inlet. The layered assembly contains a spiral shape and is concentric with a central axis of the container. The layered assembly imparts centrifugal motion in the engine bleed air as the engine bleed air travels spirally inward. A first portion of the layered assembly forces a first set of droplets in the bleed air toward an outer layer of the layered assembly. The first portion of the layered assembly receives the first set of droplets. The layered assembly also includes a mesh matrix that collects a second set of droplets out of the engine bleed air. The second set of droplets impacts the mesh matrix and coalesces to form a third set of droplets. A perforated tube is disposed along the central axis of the container. The perforated tube is in fluid communication with the layered assembly and collects the engine bleed air from the layered assembly. Gravity draws the first and third sets of droplets into a reservoir.

Another embodiment of the present disclosure includes a method of removing mist from an air flow. The method includes inserting engine bleed air into a container through an inlet. The engine bleed air is flowed into a first end of the layered assembly. The layered assembly is in fluid communication with the inlet. The layered assembly also includes a spiral shape and is concentric with a central axis of the container. Centrifugal motion is imparted in the engine bleed air as the engine bleed air travels along a spiral flow-path through the layered assembly. A first set of fluid droplets is forced toward an outer layer of the layered assembly and is received by a first portion of the layered assembly. A second set of droplets impacts with a mesh matrix that is disposed within the layered assembly. The second set of droplets coalesces into a third set of droplets. The engine bleed air is drawn from the layered assembly into a perforated tube located along the central axis of the container. The perforated tube is in fluid communication with the layered assembly. Gravity draws the first and third sets of droplets into a reservoir where they are collected.

DETAILED DESCRIPTION

Figure 1:
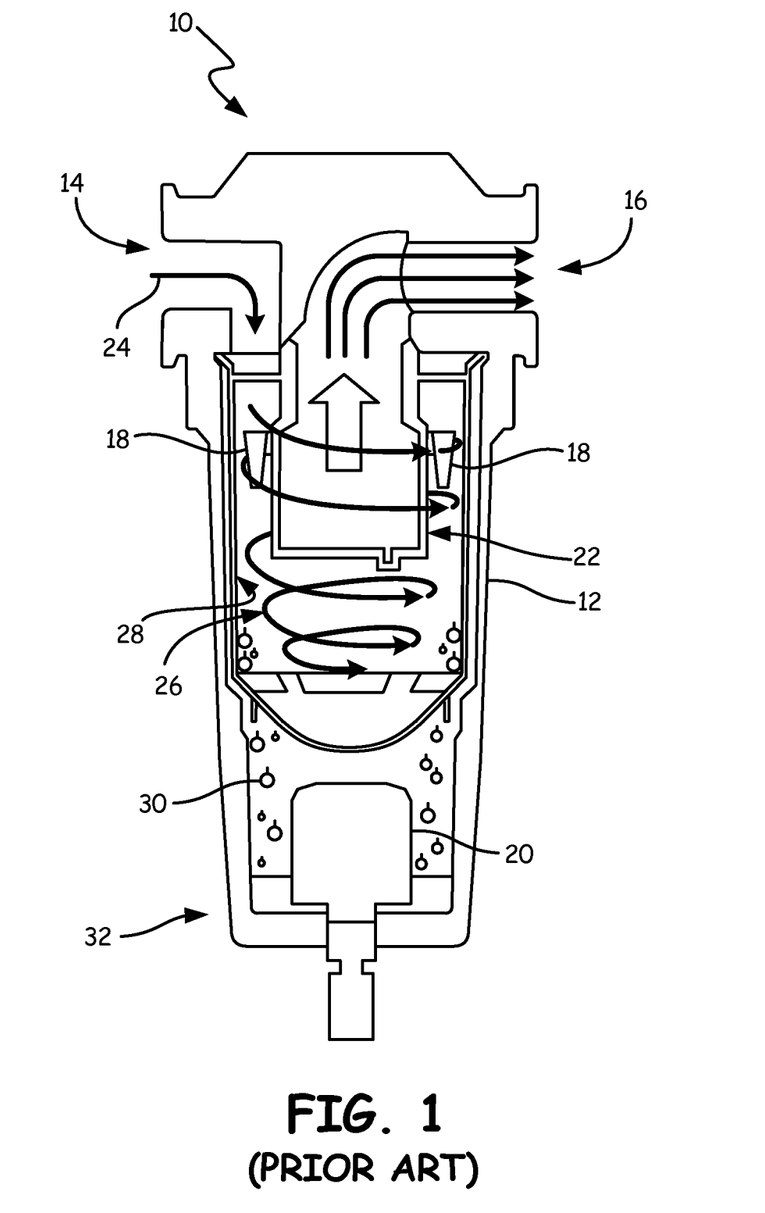
FIG. 1 is a cross-sectional view of a prior art centrifugal separator.

FIG. 1 is a cross-sectional view of prior art centrifugal separator 10. Prior art centrifugal separator 10 includes housing 12, inlet 14, outlet 16, vortex generator 18, drain 20, and tube 22. Inlet airflow 24 enters prior art centrifugal separator 10 at inlet 14. As inlet airflow 24 enters prior art centrifugal separator 10, centrifugal motion is imparted onto inlet airflow 24 by vortex generator 18 to create spiral airflow 26. Vortex generator 18 is mounted to tube 22 and includes vanes for imparting centrifugal motion in spiral airflow 26. Spiral airflow 26 travels in a spiral motion within prior art centrifugal separator 10. Inner surface 28 of prior art centrifugal separator 10 collects droplets 30 from spiral airflow 26. Droplets 30 are drawn downward by gravity along inner surface 28 and into reservoir 32. After droplets 30 are removed from spiral airflow 26, spiral airflow 26 is drawn up tube 22 and outlet airflow 34 exits prior art centrifugal separator 10 through outlet 16.

As inlet airflow 24 enters prior art centrifugal separator 10, inlet airflow 24 may contain low vapor pressure fluids such as compressor oils and hydraulic fluids, typically in the form of fine aerosols or mist. Spiral airflow 26 centrifugally forces the fine aerosols and mist outwardly towards inner surface 28. Inner surface 28 then collects droplets from the fine aerosols and mist to create droplets 30. Droplets 30 are then drawn downward by gravity into reservoir 32 to be removed from prior art centrifugal separator 10 through drain 20.

Although prior art centrifugal separator 10 removes droplets 30 from spiral airflow 26, droplets 30 include mostly droplets that are larger in size. Smaller sized droplets entrained in spiral airflow 26 are not removed because the amount of centrifugal force applied to spiral airflow 26 is not enough to remove the smaller droplets of the fine aerosols or mist.

Figure 2:
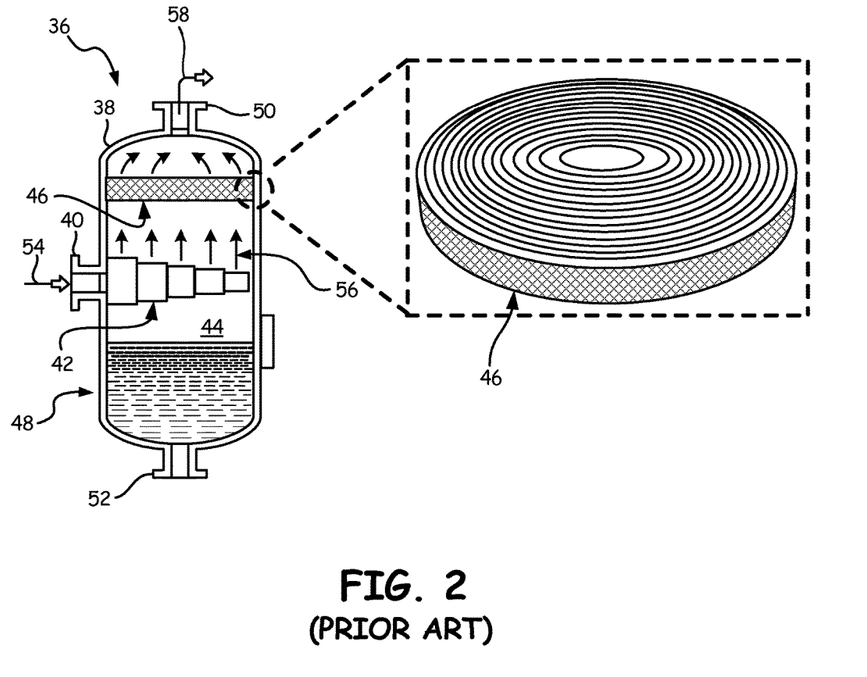
FIG. 2 is cross-sectional view of a prior art demister.

FIG. 2 is cross-sectional view of prior art demister 36. Prior art demister 36 includes housing 38, airflow inlet 40, inlet diffuser 42, inner chamber 44, coalescing filter 46, reservoir 48, airflow outlet 50, and drain 52. Airflow 54 enters housing 38 through airflow inlet 40. Airflow 56 then passes through inlet diffuser 42 and into inner chamber 44. Airflow 56 is then drawn upwards and into coalescing filter 46. Airflow 58 then exits inner chamber 44 through airflow outlet 50. Reservoir 48 is located at the gravitational bottom of prior art demister 36 in order to collect fluids filtered by coalescing filter 46.

As airflow 56 is drawn through coalescing filter 46, droplets entrained in airflow 56 collide with the surfaces of coalescing filter 46. After the droplets have impacted coalescing filter 46, the droplets coalesce into larger droplets that fall from coalescing filter 46 down into reservoir 48.

Prior art demister 36 is designed and used primarily in the chemical industry for aerosol and mist removal from air. Prior art demister 36 often includes a design prohibitively bulky and heavy for use in aerospace applications because the design is limited by necessity to a certain range of droplet sizes and/or airflow rate. The design of prior art demister 36 includes equipment weight and footprint too large for use in an aircraft system. For example, in such a design, aerosol removal performance depends on equipment size (height), which can become significant if relatively high air purity is required. Taller equipment increases the size and weight of the demister which are unsuitable attributes for aerospace applications, where decreased weight and space provide increased functionality.

In order to remove the smaller droplets from engine bleed air, prior art demisters in general require a filter with very tiny holes to collect the smaller droplets. These very tiny holes impart a large pressure drop across the coalescing filter and increase the frequency for coalescing filter upset, contamination, and failure conditions requiring replacement of the coalescing filter. A large pressure drop and a high frequency of coalescing filter replacement add time and energy to the use of the prior art demisters and coalescing filters.

Figure 3:
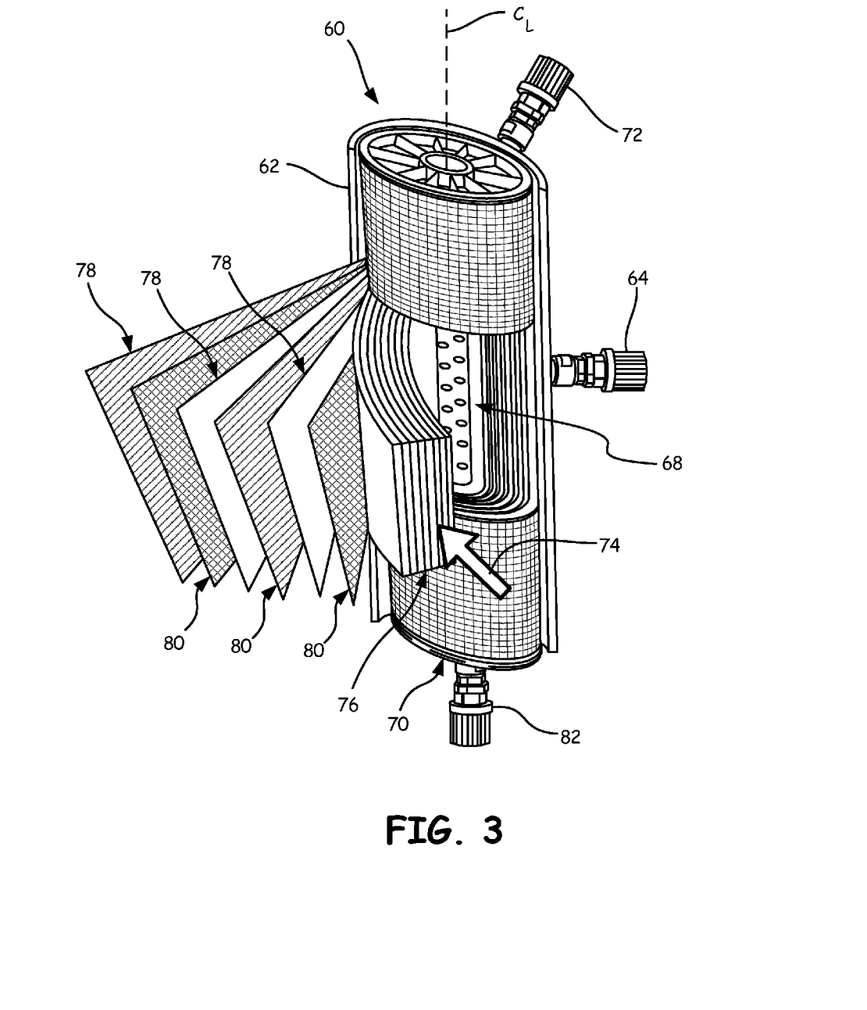
FIG. 3 is a perspective view of a spiral mist elimination system.

FIG. 3 is a perspective view of spiral mist elimination system 60. Spiral mist elimination system 60 includes container 62, air inlet 64, layered assembly 66, perforated tube 68, reservoir 70, and air outlet 72. Container 62 houses layered assembly 66, perforated tube 68, and reservoir 70. Air inlet 64 is in fluid communication with layered assembly 66. Perforated tube 68 is positioned near the center of container 62 and runs generally co-axial with central axis $C_L$. Perforated tube 68 is in fluid communication with layered assembly 66. Air outlet 72 is in fluid communication with perforated tube 68.

Air inlet 64 receives engine bleed air 74 and communicates engine bleed air 74 into layered assembly 66. Layered assembly 66 is in fluid communication with air inlet 64 and contains a spiral shape concentric with central axis $C_L$ of container 62. The spiral shape of layered assembly 66 imparts centrifugal motion in engine bleed air 74 as engine bleed air 74 travels spirally inward along layered assembly 66. As engine bleed air 74 travels spirally inward along layered assembly 66, larger droplets entrained in engine bleed air 74 are forced toward an outer layer of layered assembly 66. The outer layer of layered assembly 66 receives a first set of droplets onto the inner surface of the outer layer of layered assembly 66. The droplets entrained in engine bleed air 74 may contain oil or hydraulic fluid droplets, droplets of other types of liquids, and/or other types of particulate contaminants to be removed from engine bleed air 74.

Layered assembly 66 includes mesh matrix 76. Mesh matrix 76 includes impermeable layer 78 and mesh layer 80. The outer layer of layered assembly 66 includes impermeable layer 78. Impermeable layer 78 receives droplets that are centrifugally forced outwards as engine bleed air 74 travels spirally inward along layered assembly 66. Impermeable layer 78 can include an impermeable plastic sheet or other lightweight impermeable materials. In this example, impermeable layer 78 prevents all gas and fluids from flowing across impermeable layer 78. Other examples may include permeable layers with varying degrees of permeability therefore allowing adjustment of the types of fluids and gas allowed to flow across the permeable layer. Mesh layer 80 is shaped such that a second set of droplets from engine bleed air 74 impact mesh layer 80. After the second set of droplets impacts mesh layer 80, the second set of droplets coalesces into to a third set of droplets which are larger in size than the second set of droplets.

Mesh layer 80 can include an interwoven plastic mesh with a shape that maximizes the contact area of the surfaces of mesh layer 80. In this example, mesh layer 80 includes a plastic netting material that is used as a support for flat sheet membranes and consists of epoxy-coated polyester fibers. The weave pattern of mesh layer 80 creates multiple head-on droplet collisions with mesh layer 80 as engine bleed air flows along its cross-section. In other examples, mesh layer 80 may include other various shapes, thicknesses, widths, heights, materials, cross-sections, and various other factors to adjust the impaction rate of the droplets in engine bleed air 74 with mesh layer 80. Additionally, mesh layer 80 can include an ozone catalyst for converting ozone in engine bleed air 74 into oxygen.

After engine bleed air 74 is drawn through layered assembly 66, engine bleed air 74 is drawn into perforated tube 68. Engine bleed air 74 is then drawn out of container 62 through air outlet 72.

Reservoir 70 is located at a gravitational bottom of container 62. Reservoir 70 collects the first set of droplets received onto the inner surface of the outer layer of layered assembly 66. Reservoir 70 also collects the third set of droplets from mesh layer 80. The third set of droplets has coalesced into sizes large enough to be drawn by gravity downward out of mesh layer 80 and into reservoir 70. Drain 82 is in fluid communication with reservoir 70. Drain 82 enables the fluid in reservoir 70 to be removed from container 62. Drain 82 can be manipulated mechanically, electrically, or by other various forms of engagement.

Membrane based system 60 incorporates the functions of a centrifugal separator and a demister into a single lightweight unit. The spiral shape of layered assembly 66 increases the length of interaction between mesh layer 80 and the droplets. Additionally, the centrifugal forces imparted onto engine bleed air 74 from the spiral shape of layered assembly 66 act to move larger droplets radially outward, further increasing the probability of impacting with a layer of layered assembly 66. The multiple layers of layered assembly 66 created by the spiral shape of layered assembly 66 enable an increase in the vertical surface area encountered by engine bleed air 74 which will increase the amount of droplets collected centrifugally.

Figure 4:
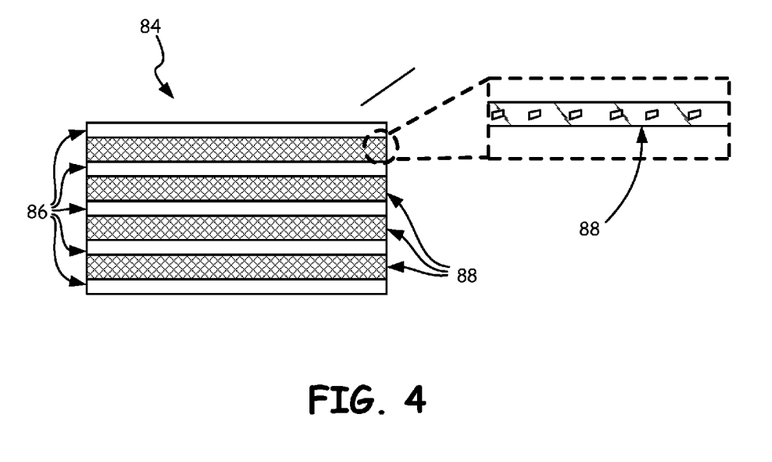
FIG. 4 is a top cross-sectional view of a mesh matrix.

FIG. 4 is a top cross-sectional view of mesh matrix 84. Mesh matrix 84 includes a series of layers including impermeable layers 86 and mesh layers 88. Mesh layers 88 can include an interwoven plastic mesh with a shape that maximizes the contact area of the surfaces of mesh layers 88. In this example, mesh layers 88 include a plastic netting material that is used as a support for flat sheet membranes and consists of epoxy-coated polyester fibers. The weave pattern of mesh layers 88 creates multiple head-on droplet collisions with mesh layers 88 as engine bleed air flows along its cross-section. In other examples, mesh layers 88 may include other various shapes, materials, cross-sections, and various other factors to adjust the impaction rate of the droplets in engine bleed air with mesh layers 88. Additionally, mesh layers 88 can include an ozone catalyst for converting ozone in engine bleed air into oxygen.

A benefit of mesh matrix 84 includes the removal of droplets from the engine bleed air with a minimized drop in air pressure across mesh matrix 84. The configuration of mesh matrix 84 also allows the engine bleed air to travel through mesh matrix 84 with a maximized impaction rate of droplets with mesh matrix 84. Another benefit of mesh matrix 84 includes prevention of problematic filter contamination involved with prior art designs of demisters with coalescing filters.

Figure 5:
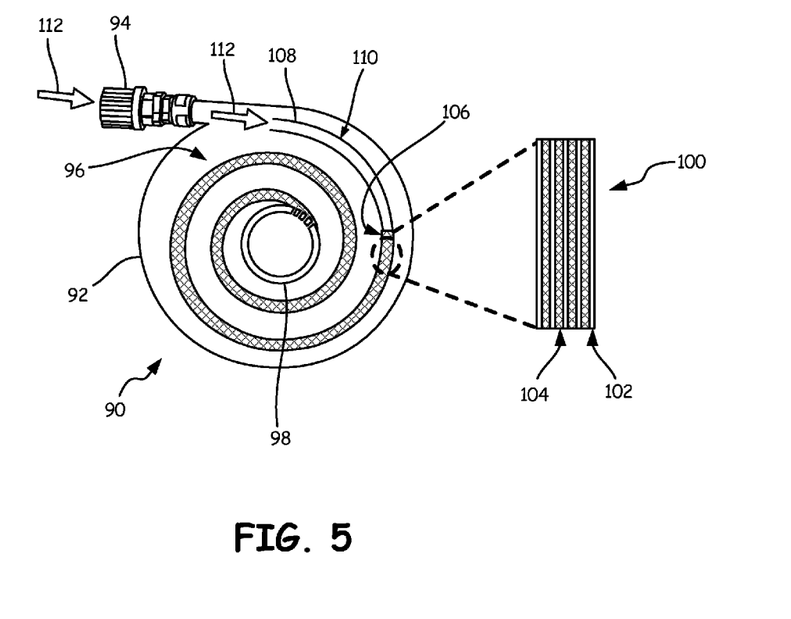
FIG. 5 is a top cross-sectional view of a spiral mist elimination system.

FIG. 5 is a top cross-sectional view of spiral mist elimination system 90. Spiral mist elimination system 90 includes container 92 with inlet 94, layered assembly 96, and perforated tube 98. Layered assembly 96 includes mesh matrix 100. Mesh matrix 100 includes permeable layers 102 and mesh layers 104.

In this embodiment, first end 106 of mesh matrix 100 is positioned spirally inward from a spirally outward-most end 108 of layered assembly 96. This spirally off-set positioning of first end 106 of mesh matrix 100 enables first portion 110 of layered assembly 96 to collect a first set of droplets from engine bleed air 112 before engine bleed air 112 encounters mesh matrix 100. The further engine bleed air 112 travels along layered assembly 96 before running into mesh matrix 100 the greater the amount of droplets that are received by first portion 110 of layered assembly 96 through centrifugal separation as described above. The spirally off-set positioning of first end 106 of mesh matrix 100 can be adjusted to effectuate various performance characteristics of spiral mist elimination system 90 and the surrounding aircraft systems.

Discussion of Possible Embodiments

The following are non-exclusive descriptions of possible embodiments of the present disclosure.

A spiral mist elimination system may include a container with an inlet to receive engine bleed air into the container. The container may include a layered assembly in fluid communication with the inlet. The layered assembly may contain a spiral shape and may be concentric with a central axis of the container. The layered assembly may impart centrifugal motion in the engine bleed air as the engine bleed air travels spirally inward. A first portion of the layered assembly may force a first set of droplets in the bleed air toward an outer layer of the layered assembly. The first portion of the layered assembly may receive the first set of droplets. The layered assembly may also include a mesh matrix that collects a second set of droplets out of the engine bleed air. The second set of droplets may impact the mesh matrix and may coalesce to form a third set of droplets. A perforated tube may be disposed along the central axis of the container. The perforated tube may be in fluid communication with the layered assembly and may collect the engine bleed air from the layered assembly. Gravity may draw the first and third sets of droplets into a reservoir.

The spiral mist elimination system of the preceding paragraph can optionally include, additionally and/or alternatively, any one or more of the following features, configurations and/or additional components:

a further embodiment of the foregoing spiral mist elimination system, wherein the mesh matrix may include at least one impermeable layer of material and at least one layer of mesh;

a further embodiment of the foregoing spiral mist elimination system, wherein the at least one layer of mesh may include a woven plastic mesh;

a further embodiment of the foregoing spiral mist elimination system, wherein at least a portion of the mesh matrix may include an ozone catalyst for converting ozone in the engine bleed air into oxygen;

a further embodiment of the foregoing spiral mist elimination system, wherein a first end of the mesh matrix may be positioned spirally inward from a spirally outward-most end of the layered assembly;

a further embodiment of the foregoing spiral mist elimination system, wherein the layered assembly may centrifugally separate the first set of droplets from the engine bleed air, wherein the first set of droplets may include a larger size than the second set of droplets;

a further embodiment of the foregoing spiral mist elimination system, wherein the container may include an outlet to expel purified air out of the container; and a further embodiment of the foregoing spiral mist elimination system, wherein the first and second sets of droplets may include oil or hydraulic fluid droplets, droplets of other types of liquids, and/or other types of particulate contaminants.

A method of removing mist from an air flow may include inserting engine bleed air into a container through an inlet. The engine bleed air may be flowed into a first end of the layered assembly. The layered assembly may be in fluid communication with the inlet. The layered assembly may also include a spiral shape and may be concentric with a central axis of the container. Centrifugal motion may be imparted in the engine bleed air as the engine bleed air travels along a spiral flow-path through the layered assembly. A first set of fluid droplets may be forced toward an outer layer of the layered assembly and may be received by a first portion of the layered assembly. A second set of droplets may impact with a mesh matrix that is disposed within the layered assembly. The second set of droplets may coalesce into a third set of droplets. The engine bleed air may be drawn from the layered assembly into a perforated tube located along the central axis of the container. The perforated tube may be in fluid communication with the layered assembly. Gravity may draw the first and third sets of droplets into a reservoir where they may be collected.

The method of removing mist from an air flow of the preceding paragraph can optionally include, additionally and/or alternatively, any one or more of the following features, configurations and/or additional components:

a further embodiment of the foregoing method of removing mist from an air flow, wherein the method may further include flowing the engine bleed air along at least one impermeable layer of material and at least one layer of mesh;

a further embodiment of the foregoing method of removing mist from an air flow, wherein the at least one layer of mesh may include a woven plastic mesh;

a further embodiment of the foregoing method of removing mist from an air flow, the method may further include converting ozone in the engine bleed air into oxygen;

a further embodiment of the foregoing method of removing mist from an air flow, wherein imparting centrifugal motion in the engine bleed air as the engine bleed air travels along a spiral flow-path through the layered assembly may further include flowing the engine bleed air through a first end of the mesh matrix that may be positioned spirally inward from a spirally outward-most end of the layered assembly; and a further embodiment of the foregoing method of removing mist from an air flow, wherein the method may further include centrifugally separating the first set of droplets from the engine bleed air, wherein receiving the first set of droplets along a first portion of the layered assembly may include collecting the first set of droplets including oil or hydraulic fluid droplets may have a larger size than the second set of droplets including oil or hydraulic fluid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spiral mist elimination system comprising:
a container;
an inlet to receive engine bleed air into the container;
a layered assembly disposed within the container, wherein the layered assembly is in fluid communication with the inlet and contains a spiral shape concentric with a central axis of the container, further wherein the layered assembly imparts centrifugal motion in the engine bleed air as the engine bleed air travels spirally inward, the layered assembly comprising:
   a first portion of the layered assembly that forces a first set of droplets entrained in the engine bleed air toward an outer layer of the layered assembly, wherein the first portion of the layered assembly receives the first set of droplets;
   a mesh matrix disposed in the layered assembly, wherein at least a portion of the mesh matrix includes an ozone catalyst for converting ozone in the engine bleed air into oxygen, wherein a second set of droplets entrained in the engine bleed air impacts the mesh matrix and coalesces to form a third set of droplets;
a perforated tube disposed along the central axis of the container, wherein the perforated tube is in fluid communication with the layered assembly and collects the engine bleed air from the layered assembly; and
a reservoir to collect the first set of droplets and the third set of droplets, wherein gravity draws the first set of droplets and the third set of droplets into the reservoir.

2. The spiral mist elimination system of claim 1, wherein the mesh matrix includes at least one impermeable layer of material and at least one layer of mesh, wherein the impermeable layer prevents all gas and fluids from flowing across the impermeable layer.

3. The spiral mist elimination system of claim 2, wherein the at least one layer of mesh includes a woven plastic mesh.

4. The spiral mist elimination system of claim 1, wherein a first end of the mesh matrix is positioned spirally inward from a spirally outward-most end of the layered assembly.

5. The spiral mist elimination system of claim 1, wherein the layered assembly centrifugally separates the first set of droplets from the engine bleed air, wherein the first set of droplets include a larger size than the second set of droplets.

6. The spiral mist elimination system of claim 1, wherein the container includes an outlet to expel purified air out of the container.

7. The spiral mist elimination system of claim 1, wherein the first and second sets of droplets include oil or hydraulic fluid droplets, droplets of other types of liquids, or other types of particulate contaminants.

8. A method of removing mist from an air flow with the spiral mist elimination system of claim 1, the method comprising:
inserting engine bleed air into the container through the inlet,
flowing the engine bleed air into a first end of the layered assembly;
imparting centrifugal motion in the engine bleed air as the engine bleed air travels along a spiral flow-path through the layered assembly;
forcing the first set of fluid droplets toward the outer layer of the layered assembly;
receiving the first set of droplets along the first portion of the layered assembly;
impacting the second set of droplets with the mesh matrix;
coalescing the second set of droplets to form the third set of droplets;
drawing the engine bleed air from the layered assembly into the perforated tube; and
collecting the first set of droplets and the third set of droplets into the reservoir, wherein gravity draws the first set of droplets and the third set of droplets into the reservoir.

9. The method of removing mist from an air flow of claim 8 further including flowing the engine bleed air along the at least one impermeable layer of material and the at least one layer of mesh.

10. The method of removing mist from an air flow of claim 9, wherein the at least one layer of mesh includes a woven plastic mesh.

11. The method of removing mist from an air flow of claim 8 further including converting ozone in the engine bleed air into oxygen.

12. The method of removing mist from an air flow of claim 8, wherein imparting centrifugal motion in the engine bleed air as the engine bleed air travels along the spiral flow-path through the layered assembly further includes flowing the engine bleed air through a first end of the mesh matrix positioned spirally inward from a spirally outward-most end of the layered assembly.

13. The method of removing mist from an air flow of claim 8 further including centrifugally separating the first set of droplets from the engine bleed air, wherein receiving the first set of droplets along the first portion of the layered assembly includes collecting the first set of droplets having a larger size than the second set of droplets.

14. The spiral mist elimination system of claim 1, wherein the reservoir is located at a gravitational bottom of the container.

15. The spiral mist elimination system of claim 1 further comprising a drain in fluid communication with the reservoir.

16. The spiral mist elimination system of claim 2, wherein the at least one layer of mesh includes epoxy-coated polyester fibers.

17. The spiral mist elimination system of claim 4, wherein the first end of the mesh matrix is spirally off-set from the spirally outward-most end of the layered assembly.

18. The method of removing mist from an air flow of claim 8 further comprising removing fluid from the container with a drain in fluid communication with the reservoir.

* * * * *